United States Patent Office 3,310,284
Patented Mar. 21, 1967

3,310,284
HYDRAULIC SYSTEM ROTARY PILOT VALVE
Seiuemon Inaba, Kawasaki-shi, Kohei Ito, Fujisawa-shi, and Ryoko Shirafuji, Tokyo, Japan, assignors to Fujitsu Limited, a corporation of Japan
Filed Aug. 20, 1964, Ser. No. 390,984
5 Claims. (Cl. 253—1)

The present invention relates to a hydraulic system rotary pilot valve. More particularly, the invention relates to a rotary pilot valve for controlling the direction and flow of fluid in a hydraulic system.

An object of the invention is to provide a new and improved hydraulic system rotary pilot valve.

The present invention relates to a rotary pilot valve for controlling the direction and the flow of fluid under pressure in a hydraulic system by changing the direction of rotation of a continuously rotating input into a displacement in the direction of the axis of the rotary valve. In accordance with the present invention, the rotary pilot valve comprises a freely rotatable spool which is displaced in the direction of the axis of the valve, when driven by a rotary input, relative to a freely rotatable sleeve positioned around the spool. The sleeve may reduce to zero the axial displacement of the spool by rotating in accordance with the rotation of the spool.

The spool of the rotary pilot valve of the present invention may be provided with a screw or a spiral thread or threaded member and a gear, and the sleeve may be provided with a nut or a spiral threaded groove which threadedly engages the screw or spiral thread of the spool. Furthermore, a gear affixed to the spool is made to overlap with a gear affixed to the rotating input supply source or motor in order to permit axial displacement of the spool.

Furthermore, in accordance with the present invention, a spring is positioned on one side of the spool and urges the spool in an axial direction thereby eliminating backlash at the other side of the spool where the screw is positioned. Also, a stopper may be provided to restrict the axial displacement of the spool to a certain range. The spool and sleeve are thus protected and maintained in a definite relationship when an overload occurs.

A feedback type electrohydraulic pulse motor may be provided by utilizing a known type of electric pulse motor as the rotary input supply source and combining with the rotary input the rotary pilot valve of the present invention and a known type of hydraulic motor driven by fluid under pressure. That is, a feedback type electrohydraulic motor is provided by coupling the spool of the rotary pilot valve of the present invention with the rotary input supply source and coupling the sleeve of the rotary pilot valve with a hydraulic motor driven by fluid under pressure.

In order that the present invention may be readily carried into effect, it will now be described with reference to the accompanying drawings, wherein.

Figure 1:
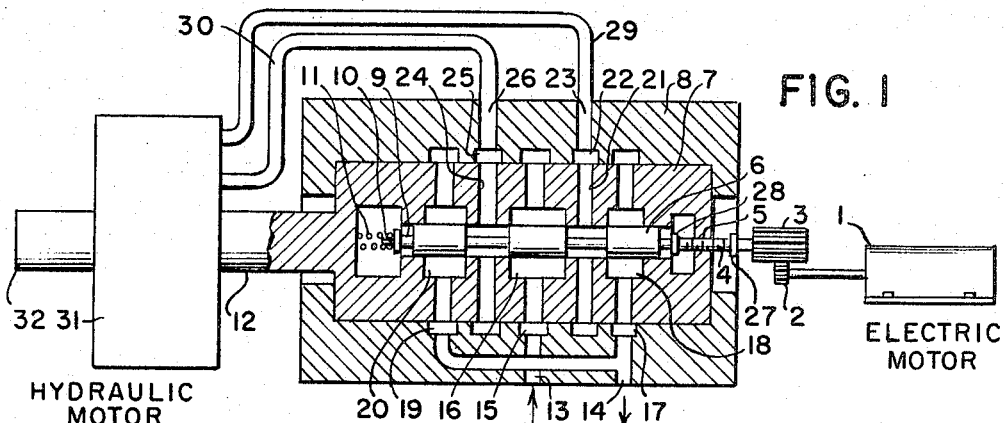
FIG. 1 is a side view, partly in section, of an embodiment of the rotary pilot valve of the present invention.

In FIG. 1, a rotary input supply source such as, for example, an electric motor 1 has a gear 2 affixed to its input shaft. A spool 6 has a gear 3 affixed to it which is in coupling relationship with the gear 2, and the rotary input supply source 1 drives the spool 6 via the gears 2, 3. One of, or both of the gears 2 and 3, is made wider than usual in order to keep the gears 2 and 3 in coupling relationship, even when the spool 6 is displaced in its axial direction.

A screw or spiral thread or threaded member 4 is provided on the spool 6 and threadedly engages a nut or spiral threaded groove 5 provided in a sleeve 7. The rotation of the spool 6 about its axis when driven by the rotary input 1 and the threaded engagement of the screw 4 with the nut 5 carries said spool to be displaced in the direction of its axis.

Figure 2:
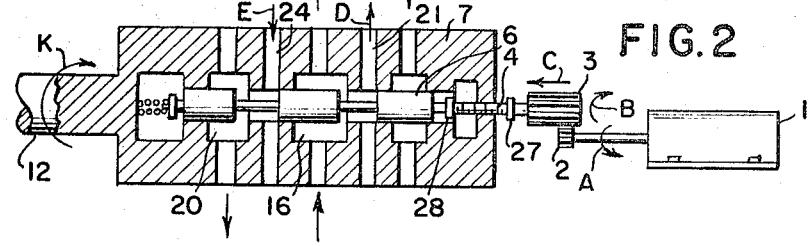
FIGS. 2 and 3 are side views, partly in section, of a part of the embodiment of FIG. 1, illustrating the movement of the parts.

Thus, if the rotary input supply source 1 is rotated in the direction of arrow A in FIG. 2, the gear 3 rotates in the direction of arrow B. The screw 4 and nut 5 displace the gear 3, and therefore the spool 6, in the axial direction of arrow C. The displacement of the spool 6 in the axial direction C permits fluid in a port 16 to flow out through a conduit 21 and permits fluid supplied via conduit 24 to flow out through a port 20. The fluid flows out of the conduit 21 in the direction of arrow D and in through the conduit 24 in the direction of arrow E.

In FIG. 1, fluid from the conduits 21 and 24 flows in rings 22 and 25, respectively, and in conduits 23 and 26, respectively, and is fed via conduits 29 and 30, respectively, to and from a hydraulic motor 31. The hydraulic motor 31 is driven by the fluid and rotates output shaft 32. The output shaft 32 not only rotates a load (not shown in the figures), but is mechanically coupled to, or connected with, a shaft 12 which is affixed to, or is integrally formed with, the other end of the rotary sleeve 7. The hydraulic motor 31, in the case where the fluid flows to said motor via the conduit 21 and from said motor via the conduit 24, therefore rotates the shaft 12 in the same direction that the gear 3 rotates the spool 6. That is, the motor 31 provides a negative feedback, so that it may make zero the axial displacement of the spool 6. Thus, when the input shaft driving the gear 2 rotates at a certain speed, the output shaft 32 of the hydraulic motor 31 rotates and maintains a determined relative angle, which is the actuating signal, to said input shaft.

Figure 3:
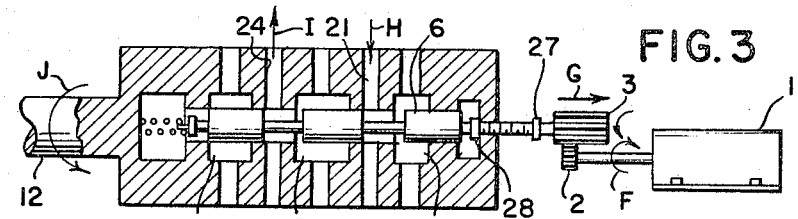

If the input shaft driving the gear 2 rotates in the opposite direction from that of FIG. 2, as shown by arrow F in FIG. 3, the spool 6 is displaced in the axial direction shown by arrow G. The fluid thus flows in via the conduit 21 and out via the conduit 24 in the direction of arrows H and I. Consequently, output shaft 32 of the hydraulic motor 31 and the shaft 12 of the sleeve 7 rotate in the direction of the arrow J of FIG. 3, whereas in FIG. 2, the shafts 32 and 12 rotate in the direction of arrow K.

The input shaft driving the gear 2, by rotating clockwise or counterclockwise, displaces the spool 6 to the left or to the right in the axial direction of said spool and rotates the output shaft 32 counterclockwise or clockwise. The foregoing describes the displacement of the spool 6 by using screws and gears and said spool may be a four-way valve.

If a steel ball 9, a support member or collar 10 and a spring 11 are positioned at the other end of the spool 6, backlash at the end of said spool near the screw 4 and the nut 5 may be eliminated. The elimination of backlash makes precision machinery and fitting of the screw 4 and the nut 5 unnecessary and said screw and nut are readily and facilely available.

One of the features of the system of the present invention is that the rotating input may be very small. Generally, in four-way valves of this type, the power provided by the fluid is comparatively great, but when the system of present invention is used the power is defined by the following expression.

Figure 4:
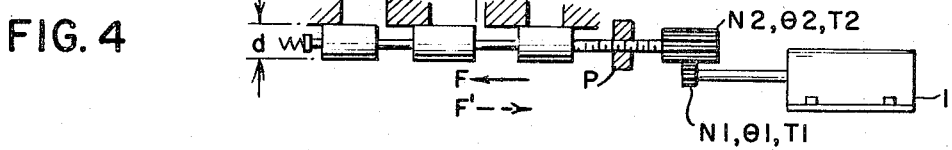
FIG. 4 is a schematic diagram illustrating the principle of operation of the rotary pilot valve of the present invention.

As illustrated in FIG. 4, when the force on the spool of the rotary pilot valve in the axial direction is F or F', the pitch of the screw is P, the number of teeth of the gear 2 is N1, the angle of rotation of the input shaft is θ1, the torque of the input shaft is T1, the number of teeth of the gear 3 is N2, the angle of rotation of the spool is θ2 and the torque of the spool is T2, the torque T1 of the rotating input shaft is $$T1 = \frac{N1}{N2} \cdot \frac{P}{\pi} \cdot F$$

The torque T1 may be made very small by selecting suitable values of P, N1 and N2.

The opening S provided by the displacement of the spool 6, which permits the flow of fluid between the sleeve 7 and the hydraulic motor 31, in accordance with the angle of rotation θ1, may be expressed as:

$$S = 2\pi \frac{d}{2} l = 2\pi d \left( \frac{P}{2\pi} \cdot \frac{N1}{N2} \cdot \theta 1 \right) = d \cdot P \cdot \frac{N1}{N2} \cdot \theta 1$$

wherein $l$ is the displacement of the spool in the direction of its axis, $d$ is the diameter of the spool, $$T1 = T2 \cdot \frac{N1}{N2}$$

and $$\theta 2 = \frac{N1}{N2} \theta 1$$

The optional elements or variables in the expression are $d$, P, N1 and N2. Thus, when a system including motor 31 is to be produced for controlling a large quantity of fluid, it may be designed to provide a good response and to operate without oscillation. This is achieved by providing the variables with suitable values.

In the hydraulic system of the present invention, the permissible displacement of the spool 6 in the axial direction may be as large as necessary. Correspondingly, the relative angle or the deflection may also be made as large as necessary. When the rotary input 1 is stepped up from the beginning of the rotation, or when the speed of rotation of the input shaft is high, large deflections are evident, and this is made possible by the system of the present invention.

The displacement of the spool 6 in the axial direction may be halted by stoppers 27 and 28 in the form of collars or rings, as shown in FIGS. 1, 2 and 3. The stoppers 27 and 28 halt the rotation of the spool 6 when the load of the output shaft 32 exceeds a determined level.

Figure 5:
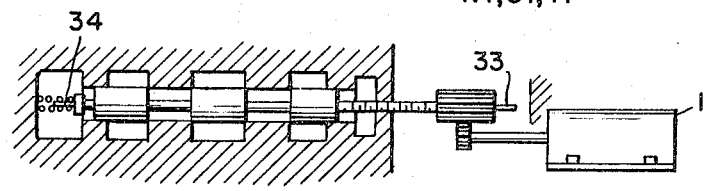
FIGS. 5 and 6 are side views, partly in section, of modifications of a part of the embodiment of FIG. 1.
Figure 6:
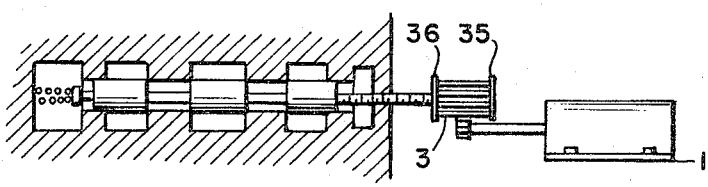

FIGS. 5 and 6 illustrate types of stoppers different from those of FIGS. 1, 2 and 3. The stoppers 27 and 28 of FIGS. 1, 2, and 3 may work into the threading of the threaded groove or nut 5, and to avoid this may be replaced by the stoppers of FIGS. 5 or 6. In FIG. 5, an extending rod-like stopper 33 may be affixed to one end of the spool and an extending rod-like stopper 34 may be affixed to the other end of said spool. In FIG. 6, an extending dog 35 may be affixed to one end of the gear 3 and an extending dog 36 may be affixed to the other end of said gear. The dogs 35 and 36 of the gear 3 function as stoppers to restrict the movement of the gear 3, and therefore the spool 6, in the axial direction.

While the invention has been described by means of specific examples and in a specific embodiment, we do not wish to be limited thereto, for obvious modifications will occur to those skilled in the art without departing from the spirit and scope of the invention.

We claim:

1. In a hydraulic system a rotary pilot valve, comprising
   a rotatably mounted sleeve having an axis and adapted to rotate about its axis;
   a rotatably mounted spool coaxially mounted inside said sleeve and adapted to rotate about its axis;
   displacing means on said sleeve and on said spool in cooperative engagement for converting rotation of said spool about its axis and for converting rotation of said sleeve about its axis into a displacement of said spool from an initial position in a direction of its axis relative to said sleeve, said displacing means comprising a threaded screw portion on said spool and a threaded nut portion on said sleeve in threaded engagement with said screw portion;
   an electric motor;
   coupling means coupling said electric motor to said spool for rotating said spool about its axis thereby displacing said spool in a direction of its axis, said coupling means comprising a first gear affixed to and rotating with said electric motor and a second gear affixed to said spool in coupling engagement with said first gear, said second gear having a longer axial dimension than said first gear; and
   an hydraulic motor coupled to said sleeve and controlled in operation by the displacement of said spool in a direction of its axis for rotating said sleeve about its axis thereby displacing said spool in the opposite direction of its axis to return the said spool to its initial position.

2. A rotary pilot valve of a hydraulic system as claimed in claim 1, wherein said spool has two spaced opposite ends, said displacing means comprises a threaded screw portion on said spool at one end thereof and a threaded nut portion on said sleeve in threaded engagement with said screw portion, the second gear of said coupling means being affixed to said spool at said one end thereof, and further comprising spring means interposed between said sleeve and the other end of said spool applying a force to said spool in a direction of its axis for eliminating backlash at said displacing means, and stopping means affixed to at least one end of said spool for restricting the displacement of the said spool in a direction of its axis.

3. In a hydraulic system a rotary pilot valve, comprising
   a rotatably mounted sleeve having an axis and adapted to rotate about its axis;
   a rotatably mounted spool coaxially mounted inside said sleeve and adapted to rotate about its axis;
   displacing means on said sleeve and on said spool in cooperative engagement for converting rotation of said spool about its axis and for converting rotation of said sleeve about its axis into a displacement of said spool from an initial position in a direction of its axis relative to said sleeve, said displacing means comprising a threaded screw portion on said spool and a threaded nut portion on said sleeve, said screw and nut portions being in threaded engagement with each other;
   an electric motor;
   coupling means coupling said electric motor to said spool for rotating said spool about its axis thereby displacing said spool in a direction of its axis, said coupling means comprising a first gear affixed to and rotating with said electric motor and a second gear affixed to said spool in coupling engagement with said first gear; and
   an hydraulic motor coupled to said sleeve and controlled in operation by the displacement of said spool in a direction of its axis for rotating said sleeve about its axis thereby displacing said spool in the opposite direction of its axis to return the said spool to its initial position.

4. A rotary pilot valve of a hydraulic system as claimed in claim 3, wherein
   said spool has two spaced opposite ends,
   said displacing means comprises a threaded screw portion on said spool at one end thereof and a threaded nut portion on said sleeve in threaded engagement with said screw portion, and further comprising spring means interposed between said sleeve and the other end of said spool applying a force to said spool in a direction of its axis for eliminating backlash at said displacing means.

5. A rotary pilot valve of a hydraulic system as claimed in claim 3, wherein said spool has two spaced opposite ends, said displacing means comprises a threaded screw portion on said spool at one end thereof and a threaded nut portion on said sleeve in threaded engagement with said screw portion, and further comprising stopping means affixed to at least one end of said spool for restricting the displacement of the said spool in a direction of its axis.

References Cited by the Examiner

UNITED STATES PATENTS

| | | | |
|---|---|---|---|
| 786,652 | 4/1905 | Larsson | 91—380 |
| 2,503,447 | 4/1950 | May | 91—378 |
| 2,601,157 | 6/1952 | Le Lon | 91—380 |
| 2,654,347 | 10/1953 | Clark | 91—380 |
| 2,960,071 | 11/1960 | Rosebrook | 91—378 |

FOREIGN PATENTS 464,891   4/1937   Great Britain.

MARTIN P. SCHWADRON, *Primary Examiner.*

PAUL E. MASLOUSKY, *Assistant Examiner.*